United States Patent

[11] 3,631,266

[72] Inventor Georges Kassabgi
Pregnana Milanese, Milan, Italy

[21] Appl. No. 14,017
[22] Filed Feb. 25, 1970
[45] Patented Dec. 28, 1971
[73] Assignee Honeywell Information Systems Italia S.p.A.
Torin, Italy
[32] Priority Feb. 27, 1969
[33] Italy
[31] 13384 A/69

[54] DELAY LINE PULSE GENERATOR
8 Claims, 6 Drawing Figs.

[52] U.S. Cl. .......... 307/265, 307/208, 307/293, 328/67
[51] Int. Cl. .......... H03k 1/18
[50] Field of Search .......... 328/66, 67, 68; 307/208, 265, 293

[56] References Cited

UNITED STATES PATENTS

| | | | |
|---|---|---|---|
| 3,094,667 | 6/1963 | Brown | 307/293 X |
| 2,188,970 | 2/1940 | Wilson | 328/67 X |
| 2,608,654 | 8/1952 | Street | 328/67 |
| 2,993,173 | 7/1961 | Fischman | 328/66 X |
| 3,096,445 | 7/1963 | Herzog | 307/293 X |
| 3,275,853 | 9/1966 | Rothrock | 307/293 X |

*Primary Examiner*—Donald D. Forrer
*Assistant Examiner*—R. C. Woodbridge
*Attorneys*—George V. Eltgroth, Lewis B. Elbinger and Frank L. Neuhauser

ABSTRACT: A circuit for generating an output pulse of predetermined amplitude and duration in response to an input pulse, wherein the roundtrip time of a wave applied to a short-circuited delay line determines the duration of the output pulse and wherein the output pulse is coupled back to the circuit input to isolate the input and make the duration of the output pulse independent of that of the input pulse.

Georges KASSABGI
INVENTOR.

BY

ATTORNEY

Georges KASSABGI
INVENTOR.

DELAY LINE PULSE GENERATOR

BACKGROUND OF THE INVENTION

The present invention relates to a circuit for generating rectangular electric pulses having a definite amplitude and duration, and more particularly to such a circuit for use in electronic data-processing equipment.

Such rectangular pulses, also known as "sampling pulses" must be generated in response to control pulses usually having a variable duration. A number of circuits of this type are known which operate by using a resistor-capacitor circuit. The charge or discharge time of the resistor-capacitor circuit depends on the values of its parameters, and thereby determines the duration of the sampling pulse generated.

Usually such circuits have poor stability, due to the variation of their parameters with time and to their sensitivity to changes in supply voltage, in temperature, etc.

Other sampling pulse generators employ electromagnetic delay lines as timing devices; however, these circuits are relatively complicated and usually require that the control pulse be longer than the generated pulse.

Therefore, it is the object of this invention to provide an improved pulse generator, stable in operation, wherein the duration of the pulse generated is independent of the input pulse.

SUMMARY OF THE INVENTION

The sampling pulse generator of this invention obviates the prior art disadvantages by using an electromagnetic delay line short circuited at one of its ends, and by applying to the delay line input a signal generated by the switching of a timing transistor in correspondence with the starting of the sampling pulse. The ending of the sampling pulse is determined by the return of the signal to the input end of the delay line after reflection at the short-circuited end. The state of the generator input is conditioned on the state of the output in such a way as to render the duration of the generated output pulse independent of the duration of the control pulse.

A sampling pulse generating circuit having high precision, excellent operating reliability, and very simple construction is thus obtained.

BRIEF DESCRIPTION OF THE DRAWING

The invention will be described with reference to the accompanying drawing, wherein.

DESCRIPTION OF THE PREFERRED EMBODIMENT

The delay line employed in the sampling pulse generator may be of the lumped or distributed constant type, and may have a propagation time chosen between very large limits. However, consistent with technical requirements, it is usually preferable to employ a distributed constant delay line, and the use of delay lines employing modern printed circuit technology appears particularly convenient; such as, for example, the delay lines described in the Italian Pat. No. 814,806, filed Oct. 24, 1967, and assigned to the assignee of the instant application.

Figure 1:
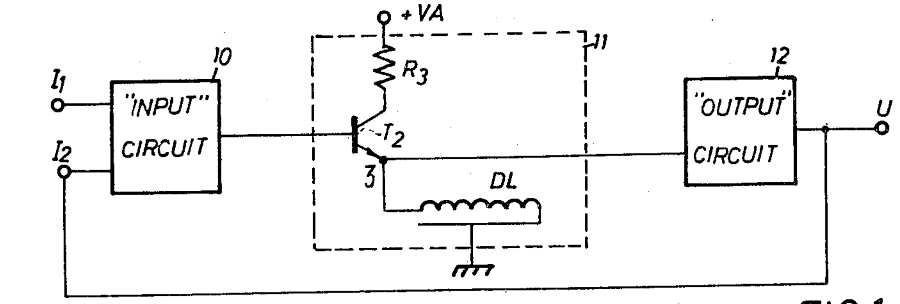
FIG. 1 is a schematic diagram showing the principle of the sampling pulse generator of the invention.

FIG. 1 schematically represents the general principle of the pulse generator of the invention. The pulse generator comprises an input circuit 10 having at least two input terminals $I_1$ and $I_2$, a timing circuit indicated generally by the reference numeral 11, and an output circuit 12. An output terminal U is connected to input terminal $I_2$ of input circuit 10.

Timing circuit 11 comprises a transistor $T_2$, for example of the NPN-type, supplied by a positive voltage +VA through a resistor $R_3$. The emitter of transistor $T_2$ is connected in series with a delay line DL, which has its opposite end short circuited and grounded. The emitter of transistor $T_2$ is also connected to the input of output circuit 12 at point 3.

When transistor $T_2$ transfers from the off to the on condition, in response to a control signal applied to input $I_1$, output circuit 12 is switched on, thus initiating a sampling pulse. At the same time a voltage step is applied to the input of delay line DL.

This voltage step propagates along the line, is reflected at the short-circuited end, and returns with inverted polarity. When it reaches the input of the line, the output circuit is switched off and the output sampling pulse terminates. So long as the output pulse exists, the input $I_2$, connected to output U, blocks input circuit 10 and prevents it from responding to any variations in the signal level applied to input $I_1$. Thus, the duration of the output sampling pulse is independent of that of the input control signal, and depends only on the propagation time of the delay line.

Figure 2:
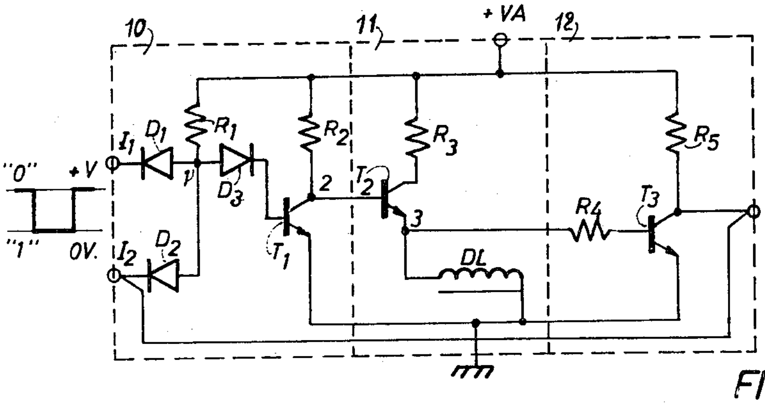
FIG. 2 is a schematic diagram of a simplified embodiment of the pulse generator of FIG. 1.

Input and output circuits 10 and 12 may be arranged in various forms in accordance with their conditions of utilization. FIG. 2 shows a simple form of input circuit 10 for use with a positive voltage source +VA and negative input signals and wherein the transistor thereof is of the NPN-type.

A positive voltage is considered to represent a binary ZERO and a zero-valued voltage is considered to represent a binary ONE. Thus a signal is present when the output is at the 0 volt level.

Output circuit 12 is an inverter amplifier comprising a transistor $T_3$, supplied from voltage source +VA through a resistor $R_5$. The base of transistor $T_3$ is connected to the emitter of transistor $T_2$ through a resistor $R_4$. Output U, connected to the collector of transistor $T_3$, is also connected to input $I_2$ of input circuit 10.

The input circuit, indicated generally by the reference numeral 10, comprises a transistor $T_1$ of the NPN-type, supplied by the positive voltage source VA through a resistor $R_2$, cooperating with a resistor $R_1$ and diodes $D_1$, $D_2$, and $D_3$ to form a circuit of the NOR type, having two inputs $I_1$ and $I_2$.

In the quiescent condition no control signal is applied to input $I_1$, which therefore is at a positive voltage level. Input $I_2$ is also at a positive voltage level, no signal being present at the output U.

Under these conditions a current flows through resistor $R_1$, diode $D_3$, and the base and emitter of transistor $T_1$. Point 1 is at a positive voltage level, due to the sum of the voltage drops through diode $D_3$ and the base-emitter junction of transistor $T_1$. However, this level of point 1 is substantially lower than the voltage +V of inputs $I_1$ and $I_2$ when no input signal is applied, so that both of diodes $D_1$ and $D_2$ are reverse biased and do not conduct. Since transistor $T_1$ is conductive, point 2 is at substantially zero voltage, and transistor $T_2$ is off. Point 3 is at 0 v., and transistor $T_3$ is off. As a consequence, output U is at positive voltage level, representing the absence of an output signal, and this positive voltage is coupled back to input $I_2$. As point 3 is at 0 v., and transistor $T_2$ is off, no current flows through delay line DL.

If, now, a control signal is applied to input $I_1$; i.e., input $I_1$ falls to 0 v., diode $D_1$ becomes forward-biased and a current flows therethrough. Point 1 falls to a voltage near 0 v., differing from zero voltage only by the voltage drop across diode $D_1$, which is approximately 0.7 v. for silicon diodes. As the voltage drop across diode $D_3$ is substantially the same as the drop across diode $D_1$, the base of transistor $T_1$ falls to 0 v. and transistor $T_1$ goes off. Point 2 becomes positive and transistor $T_2$ conducts, thus applying a positive voltage increase across the characteristic impedance of delay line DL. Therefore point 3 rises to a positive voltage having a value depending on the value of resistor $R_3$ and the resistive value of the characteristic impedance of delay line DL, which may be, for instance, +2 v. This voltage increase causes a positive voltage step to be applied to the input of delay line DL and, in addition, its application through resistor $R_4$ to the base of transistor $T_3$ causes the latter to go on. Therefore output U drops to to 0 v., initiating the output sampling pulse. At the same time input $I_2$ drops to 0 v., and diode $D_2$ becomes forward-biased and conducts.

Figure 3:
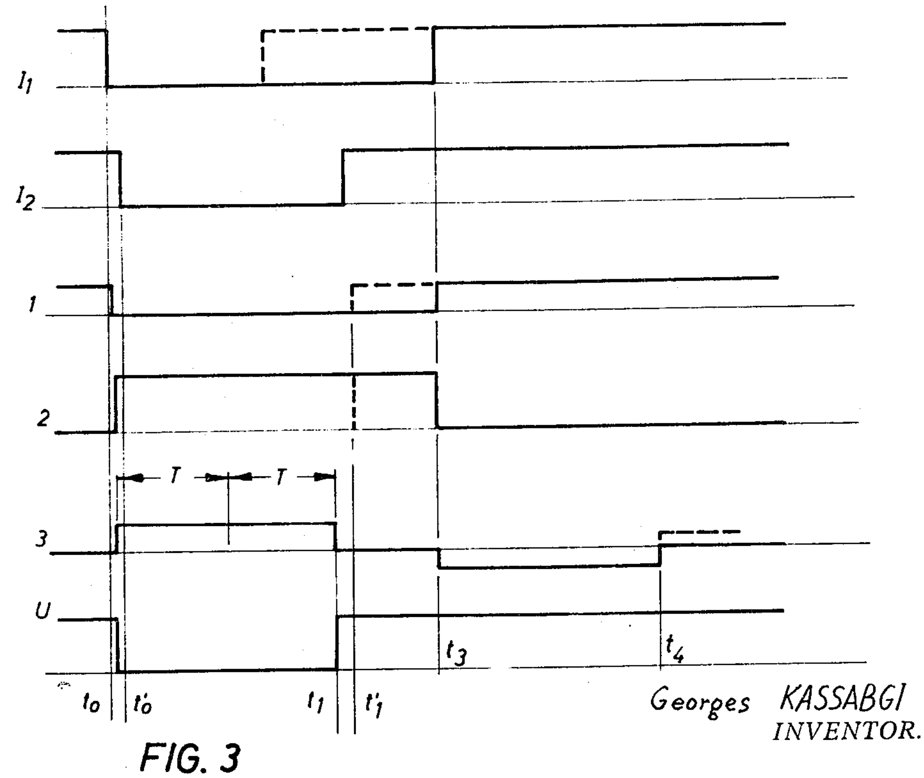
FIG. 3 illustrates waveforms at different points in the circuit of FIG. 2.

The action described occurs, with respect to the starting time $t_9$, only after a very small delay ($t'_0-t_0$), depending on the switching times of the cascaded transistors, as shown in FIG. 3, wherein the waveforms at different points of the circuit are represented.

The positive voltage step, supplied to the delay line input, propagates as a positive wave front along the line and, after a time T (the propagation time of the line) reaches the short-circuited end. The wave front is reflected and returns toward the delay line input. Because the voltage reflection coefficient of a short-circuited line is equal to −1, the incident front is inverted, and, therefore, a wave front of 0 v. propagates toward the delay line input. When this front reaches the line input, point 3 drops to 0 v. Transistor $T_3$ thereupon goes off, output U returns to a positive voltage level, and the output sampling pulse terminates. Its duration is therefore exactly 2T.

During the occurrence of the sampling pulse, input $I_2$ is at 0 v., diode $D_2$ is forward-biased, and point 1 is close to 0 v. Therefore transistor $T_1$ remains off, independent of the state of input $I_1$.

Thus, even if the control signal terminates before the end of the output sampling pulse, the length of the latter is not affected.

At the end of the sampling pulse, input $I_2$ returns to the positive voltage level, and the state of transistor $T_1$ depends once again on the state of input $I_1$. If the control signal has ended, and therefore input $I_1$ is at a positive level, as indicated by the broken lines on the $I_1$ waveform of FIG. 3, when the sampling pulse ends point 1 returns to the positive voltage level, transistor $T_1$ goes on and transistor $T_2$ goes off. This occurs after a small delay ($t'_1-t_1$) with reference to time $t_1$ wherein the returning wave front reaches the input of the delay line. On the contrary, if the control pulse has not terminated, transistor $T_1$ remains off and transistor $T_2$ on until the pulse ends.

In both cases, the returning wave front which reaches the delay line input finds transistor $T_2$ on, though, in one case only for a small time interval ($t'_1-t_1$). Therefore, the impedance of the external circuit, as seen from the delay line input, is determined by the resistance of resistor $R_3$ in parallel with the resistance of resistor $R_4$ in series with the base-emitter resistance of transistor $T_3$. Initially, the latter resistance is relatively high, and rapidly increases as transistor $T_3$ moves toward the off condition. Therefore, practically the delay line may be considered to be terminated at its input by resistor $R_3$.

As the value of resistor $R_3$ may be chosen to be approximately equal to the characteristic resistance of the line, the negative wave front is not reflected at the input of the line. Therefore, a current continues to flow through the delay line, whose input is now at the 0 v. level.

When a control signal which is assumed to last longer than the sampling pulse terminates, i.e., at time $t_3$, point 1 returns to the positive voltage level, transistor $T_1$ goes on, point 2 drops to 0 v., and transistor $T_2$ starts to turn off. If transistor $T_2$ turned off at once, the current flowing through the delay line would cease thereby providing a negative voltage step at the input of the delay line. A negative wave front would propagate along the line, would be reflected at the shorted end, and would reappear after a time equal to 2T as a positive voltage step at the input. As such step would find the delay line open at its input, it would be doubled in value by the input reflection and would bring point 3 to a positive voltage level, thereupon turning transistor $T_3$ on and originating a faulty signal.

However, because point 3 tends to go toward a negative voltage level, transistor $T_2$ cannot turn off at once. Thus, if its base is at 0 v., as soon as its emitter reaches a negative voltage lower than 0.8–1.0 v., the transistor would become conductive. The negative voltage step which propagates along the line cannot be larger, in absolute value, than 0.8–1.0 v., so that when the step returns as a positive value, it is generally so attenuated as to be unable to affect the condition of transistor $T_3$.

Figure 4:
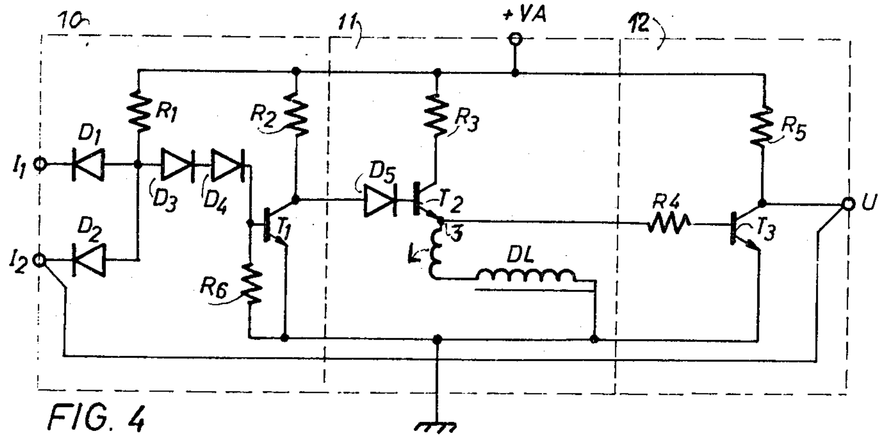
FIG. 4 is a schematic diagram of an improved embodiment of the pulse generator of the invention.

However, it may be convenient to provide an arrangement for positively preventing the faulty operation indicated above. The diagram of FIG. 4 shows a circuit as in FIG. 2, modified to prevent such faulty operation.

A diode $D_5$, connected between the collector of transistor $T_1$ and the base of transistor $T_2$, increases the time required for transistor $T_2$ to transfer from the on to the off state by slowing the removal of the charge stored in the base. Transistor $T_2$ therefore turns off gradually and the sharp interruption of the current flowing through the delay line, which otherwise would cause a steep negative front, is prevented. An inductance L, connected between the emitter of transistor $T_2$ and the delay line input, also has the purpose of reducing the steepness and the amplitude of the voltage step applied to the input of the line, thus limiting the reflected voltage step present at point 3 to a value substantially lower than the conduction threshold of transistor $T_3$. The value of inductance L may be suitably chosen in order that its attenuation of the negative return pulse which determines the end of the sampling pulse be practically negligible with reference to the value of such pulse.

The addition of a second diode $D_4$ to the circuit of the base of transistor $T_1$ greatly enhances the protection of the circuit against possible external disturbances which might drive transistor $T_1$ on during the sampling pulse. A resistor $R_6$ connected between base and emitter of transistor $T_1$ defines more precisely the voltage level of the base during the conduction phase.

Figure 5:
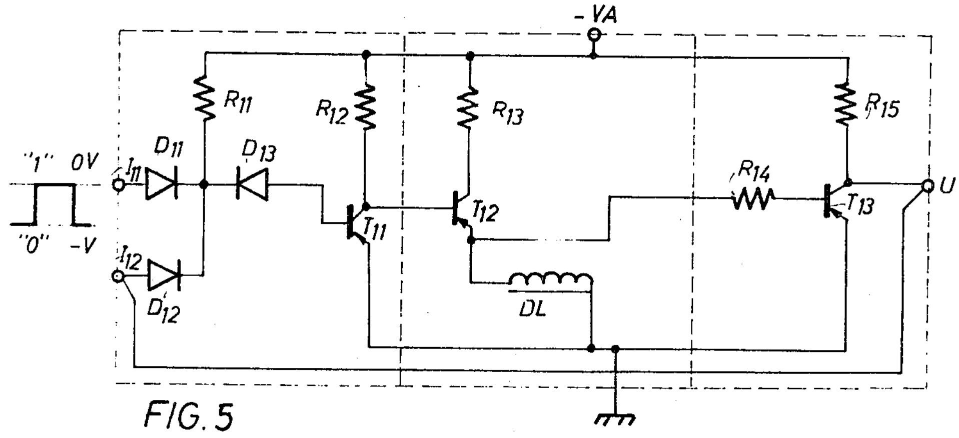
FIG. 5 is a schematic diagram of a sampling pulse generator for use with a negative supply voltage and positive input signals.

If sampling pulses of positive polarity are required, in the positive signal operating mode, the circuit shown in FIG. 5 may be used. This circuit corresponds to that of FIG. 2, except for its use of PNP-transistors and a negative voltage source −VA, Binary ZERO, the condition of the absence of signals, corresponds to a negative voltage −V and binary ONE, the presence of a signal, is the 0 voltage level. The connections of the diodes and the polarity of the voltage signals are inverted with respect to these of FIG. 2. With such changes the description of the operation of the circuit is the same as that set forth previously.

Figure 6:
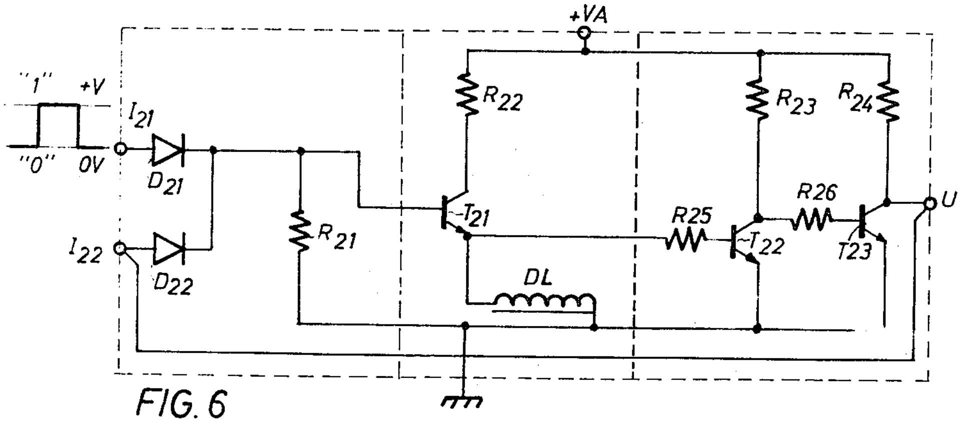
FIG. 6 is a schematic diagram of a sampling pulse generator for use with a positive supply voltage and positive input signals.

FIG. 6 is the schematic diagram of a sampling pulse generator for operation with a positive voltage source +VA and NPN-transistors Operation is with positive control signals, but the binary ZERO is represented by 0 v., and the binary ONE by a positive voltage +V. The timing circuit transistor $T_{21}$ is directly driven by an OR circuit, which comprises diodes $D_{21}$ and $D_{22}$. In the quiescent condition the base of transistor $T_{21}$ is at 0 v., and transistor $T_{21}$ is off. A positive control signal applied to input $I_{21}$ drives transistor $T_{21}$ on. The output circuit is formed by two cascaded inverters using transistors $T_{22}$ and $T_{23}$ and associated resistors $R_{23}$, $R_{24}$, $R_{25}$, and $R_{26}$. The diagram of the voltage pulses on the delay line is the same as that for the embodiment of FIG. 2.

Although the diagrams and the description above refer to semiconductor components indicated as diodes and transistors for expressing their functions, it is apparent that the invention is not limited to embodiments using discrete elements, but applies to circuits using integrated circuit units according to known techniques wherein different electronic elements performing their characteristic functions are obtained by suitable modifications of a single semiconductor substrate.

I claim:

1. A circuit for generating pulses of predetermined and constant duration, having an input circuit provided with at least two input terminals for receiving control pulses, a timing circuit, and an output circuit, where the improvement comprises, a transistor, a resistor, and an electromagnetic delay line forming said timing circuit, said transistor having the collector thereof supplied from a suitable voltage source through said resistor, said resistor separated from said delay line by said transistor, the base which is the characteristic impedance of said delay lines and of said transistor connected to said input circuit, and the emitter thereof connected to the input of said delay line, said delay line being short circuited at its opposite end and said emitter also being connected to the input of said output circuit.

2. The circuit of claim 1 wherein said output circuit has a suitable input threshold voltage and is adapted to be switched between two predetermined states in response to a switching signal received from said timing circuit, the switching of said output circuit generating at an output terminal thereof a suitable signal having a duration determined by the propagation time of the delay line.

3. A circuit for generating pulses of predetermined and constant duration, having an input circuit provided with at least two input terminals for receiving control pulses, a timing circuit, and an output circuit, wherein the improvement comprises, a transistor, a resistor, an inductor and an electromagnetic delay line forming said timing circuit, said transistor having the collector thereof supplied from a suitable voltage source through said resistor, said resistor separated from said delay line by said transistor, the base of said transistor connected to said input circuit, said delay line being short circuited at its opposite end and said emitter also being connected to the input of said output circuit and wherein an inductor is connected between the emitter of said transistor and the input of said delay line.

4. The circuit of claim 3 wherein said output circuit has a suitable input threshold voltage and is adapted to be switched between two predetermined states in response to a switching signal received from said timing circuit, the switching of said output circuit generating at an output terminal thereof a suitable signal having a duration determined by the propagation time of the delay line.

5. A circuit for generating pulses of predetermined and constant duration, having an input circuit provided with at least two input terminals for receiving control pulses, a timing circuit, and an output circuit, wherein the improvement comprises, a transistor, a resistor, and an electromagnetic delay line forming said timing circuit, said transistor having the collector thereof supplied from a suitable voltage source through said resistor, said resistor which is the characteristic impedance of said delay line and separated from said delay line by said transistor, the base of said transistor connected to said input circuit, and the emitter thereof connected to the input of said delay line, said delay line being short circuited at its opposite end and said emitter also being connected to the input of said output circuit, and wherein said output signal is applied to one of said input terminals of said input circuit, said output circuit having a suitable input threshold voltage and is adapted to be switched between two predetermined states in response to a switching signal received from said timing circuit, the switching of said output circuit generating at an output terminal thereof a suitable signal having a duration determined by the propagation time of the delay line.

6. The circuit of claim 5 wherein an inductor is connected between the emitter of said transistor and the input of said delay line.

7. The circuit of claim 4, wherein said resistor has a resistance value approximately equal to the value of the characteristic impedance of said delay line.

8. A pulse-generating circuit comprising in combination:

a timing circuit comprising a transistor having a control electrode and an output electrode and a delay line having one end thereof short circuited, said output electrode being coupled to deliver current to the other end of said delay line;

an input circuit having two input terminals and an output terminal, said input circuit being normally enabled for responding to the leading edge of a control signal received at one of said input terminals to provide a signal on said output terminal, said input circuit responding to a signal received at the other of said input terminals for disabling said input circuit from responding to control pulses received at said one input terminal;

an output amplifier having an input terminal and an output terminal;

means coupling the output terminal of said input circuit to said control electrode of said transistor; and means coupling the input terminal of said output amplifier to said output electrode of said transistor; and means coupling said output terminal of said output amplifier to said other input terminal of said input circuit.

* * * * *

UNITED STATES PATENT OFFICE
CERTIFICATE OF CORRECTION

Patent No. 3,631,266 Dated December 28, 1971

Inventor(s) Georges Kassabgi, et al

It is certified that error appears in the above-identified patent and that said Letters Patent are hereby corrected as shown below:

Column 5, line 4, after "said resistor" insert -- which is the characteristic impedance of said delay line and -- ; lines 5 and 6, delete "which is the characteristic impedance of said delay lines and".

Signed and sealed this 17th day of October 1972.

(SEAL)
Attest:

EDWARD M.FLETCHER, JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334.